(12) United States Patent
Deevi et al.

(10) Patent No.: US 6,746,508 B1
(45) Date of Patent: Jun. 8, 2004

(54) NANOSIZED INTERMETALLIC POWDERS

(75) Inventors: Seetharama C. Deevi, Midlothian, VA (US); A. Clifford Lilly, Jr., Chesterfield, VA (US)

(73) Assignee: Chrysalis Technologies Incorporated, Richmond, VA (US)

( * ) Notice: Subject to any disclaimer, the term of this patent is extended or adjusted under 35 U.S.C. 154(b) by 0 days.

(21) Appl. No.: 10/110,534

(22) PCT Filed: Oct. 23, 2000

(86) PCT No.: PCT/US00/29105
§ 371 (c)(1),
(2), (4) Date: Jul. 18, 2002

(87) PCT Pub. No.: WO01/30520
PCT Pub. Date: May 3, 2001

Related U.S. Application Data

(60) Provisional application No. 60/160,864, filed on Oct. 22, 1999.

(51) Int. Cl.$^7$ ................................................. B22F 1/00
(52) U.S. Cl. ....................... 75/255; 75/245; 252/62.55; 502/327
(58) Field of Search ................ 75/255, 245; 252/62.55; 502/327

(56) References Cited

U.S. PATENT DOCUMENTS

| | | | |
|---|---|---|---|
| 4,705,762 A | 11/1987 | Ota et al. | 501/87 |
| 5,480,713 A * | 1/1996 | Sasaki et al. | 428/323 |
| 5,512,363 A * | 4/1996 | Goto et al. | 428/323 |
| 5,562,771 A | 10/1996 | Kawaguchi | 117/92 |
| 5,580,655 A | 12/1996 | El-Shall et al. | 428/402 |
| 5,597,558 A | 1/1997 | Aubert et al. | 424/70.1 |
| 5,618,475 A | 4/1997 | Johnson et al. | 264/10 |
| 5,665,277 A | 9/1997 | Johnson et al. | 264/6 |
| 5,695,617 A | 12/1997 | Gravier et al. | 204/157.41 |
| 5,728,195 A | 3/1998 | Eastman et al. | 75/351 |
| 5,770,022 A | 6/1998 | Chang et al. | 204/164 |
| 5,851,507 A | 12/1998 | Pirzada et al. | 423/659 |
| 5,879,715 A | 3/1999 | Higgins et al. | 428/489 |
| 5,891,548 A | 4/1999 | Gravier et al. | 428/59 |
| 5,958,329 A | 9/1999 | Brown | 266/176 |
| 5,962,132 A | 10/1999 | Change et al. | 428/402 |
| 6,080,337 A | 6/2000 | Kambe et al. | 252/521.1 |

FOREIGN PATENT DOCUMENTS

EP  0493114 A2 *  7/1992  .............. G11B/5/66

OTHER PUBLICATIONS

Amilis, X. et al., "Microstructure and Hardness of a Nanostructured Fe–40Al at % Alloy", NanoStructured Materials, vol. 12, pp. 801–806, 1999.

Jartych E., et al., "Hyperfine Interactions in Nanocrystalline Fe–Al Alloys", J. Phys, Condens. Matter, 10:4929 (1998), pp. 4929–4936.

Perez R.J., et al., "Thermal Stability of Nanocrystalline Fe–10 wt. % Al Produced by Cryogenic Mechanical Alloying", Nanostructured Materials, 7:565 (1996), pp. 565–572.

Haber et al., "Nanostructure by Design: Solution–phase–processing Routes to Nanocrystalline Metals, Ceramics, Intermetallics, and Composites", J. Aerosol Sci. (1998), pp. 637–645.

Jartych, E. et al., "Magnetic Properties and Structure of Nanocrystalline Fe–Al and Fe–Ni Alloys", NanoStructured Materials, vol. 12, pp. 927–930, 1999.

* cited by examiner

Primary Examiner—Ngoclan T. Mai
(74) Attorney, Agent, or Firm—Burns, Doane, Swecker & Mathis, LLP

(57) ABSTRACT

Nanoparticles of intermetallic alloys such as FeAl, $Fe_3Al$, NiAl, TiAl and FeCoV exhibit a wide variety of interesting structural, magnetic, catalytic, resistive and electronic, and bar coding applications. The nanosized powders can be used to make structural parts having enhanced mechanical properties, magnetic parts having enhanced magnetic saturation, catalyst materials having enhanced catalytic activity, thick film circuit elements having enhanced resolution, and screen printed images such as magnetic bar codes having enhanced magnetic properties. In contrast to bulk FeAl materials which are nonmagnetic at room temperature, the FeAl nanoparticles exhibit magnetic properties at room temperature.

15 Claims, No Drawings

NANOSIZED INTERMETALLIC POWDERS

This application is a 371 of PCT/US00/29105 Oct. 23, 2000 which Corres. to U.S. Provisional Application No. 60/160,184, filed Oct. 22, 1999.

FIELD OF THE INVENTION

The invention relates to nanosized powders for applications such as structural, magnetic, catalytic, resistive and electronic, and bar coding applications.

BACKGROUND

Nanocrystalline materials such as nanocrystalline nickel have been reported to have uses such as wear resistant coatings, hydrogen storage materials, magnetic materials and catalysts for hydrogen evolution. See U.S. Pat. No. 5,352,266 wherein it is reported that nanocrystalline materials, nanophase materials or nanometer-sized crystalline materials can be prepared by sputtering, laser ablation, inert gas condensation, oven evaporation, spray conversion pyrolysis, flame hydrolysis, high speed deposition, high energy milling, sol-gel deposition and electrodeposition. In the field of catalysis, U.S. Pat. No. 5,547,649 discloses the use of nanocrystalline titania for hydrogen sulfide conversion.

Nanocrystalline materials have been reportedly made from metals (e.g., M50 type steel, Pd, Cu, intermetallics (e.g., $Al_{52} Ti_{48}$)), semiconductors such as Si, metal carbonates such as $ZnCO_3$, and metal oxides (e.g., $SiO_2$, $TiO_2$, $Y_2O_3$, ZnO, MgO, $Al_2O_3$). See, for example, U.S. Pat. Nos. 5,580,655; 5,589,011; 5,695,617; 5,770,022; 5,876,683; 5,879,715; 5,891,548 and 5,962,132, the disclosures of which are hereby incorporated by reference. According to these patents, the production of nanocrystalline materials has been achieved by methods such as chemical synthesis, gas-phase synthesis, condensed phase synthesis, high speed deposition by ionized cluster beams, consolidation, high speed milling, deposition and sol-gel methods.

One method reported in the literature for the synthesis of intermetallic nanocrystalline material is mechanical ball milling. (Jartych E., et al., J. Phys. Condens. Matter, 10:4929 (1998); Jartych E., et al., Nanostructured Materials, 12:927 (1999); Amilis, X., et al., Nanostructured Materials 12:801 (1999); Perez R. J., et al., Nanostructured Materials, 7:565 (1996)). Jartych et al. report preparation of nanocrystalline powders of Fe-30 at. % Al, Fe-40 at. % Al and Fe-50 at. % Al by ball milling, all of which were found to possess strong ferromagnetic interactions. (Jartych E., et al., J. Phys. Condens. Matter, 10:4929 (1998); Jartych E., et al., Nanostructured Materials, 12:927 (1999)). However, the authors reported that even after 800 hours of milling time, small quantities of α-Fe were still present in the samples as indicated by the hyperfine magnetic field distribution measurements. The presence of α-Fe is believed to produce defects and high strain levels within the milled material. Amilis and coworkers reported that the microhardness of ball milled Fe-40Al at% alloy directly correlated with defect concentration. (Amilis, X., et al., Nanostructured Materials 12:801 (1999)). They reported possible media contamination during the process of ball milling, which resulted in the presence of low concentrations of $SiO_2$ from the agate used for milling and presence of $Fe_3Al$.

Perez and coworkers reportedly synthesized nanocrystalline Fe-10 at. % Al using cryogenic milling at liquid nitrogen temperature. (Perez, R. J., et al., Nanostructured Materials, 7:565 (1996)). The thermal stability of the milled material was found to be significantly higher than that of Fe milled under analogous conditions. The authors speculated that this increase in stability might be due to the formation of fine dispersoids of $\gamma$-$Al_2O_3$ or AlN, which would restrict the movement of the grain boundaries. In spite of the simplicity and efficiency of ball milling as a means by which nanocrystalline metallic alloys may be synthesized, there are some problems and limitations. For example, the microstructure of the milled products is very sensitive to the grinding conditions and may be unpredictably affected by unwanted contamination from the milling media and atmosphere. In addition, excessively long periods of milling time may be required. (Amilis, X., et al., Nanostructured Materials 12:801 (1999); Perez R. J., et al., Nanostructured Materials, 7:565 (1996)).

A process for manufacturing a magnetic core made of an iron-based soft magnetic alloy having a nanocrystalline structure is disclosed in U.S. Pat. No. 5,922,143. Nanocrystalline alloys having magnetic properties are also disclosed in U.S. Pat. Nos. 5,340,413 and 5,611,871. U.S. Pat. No. 5,381,664 discloses a nanocomposite superparamagnetic material that includes nanosized particles of a magnetic component (rare earth and transition element) dispersed within a bulk matrix.

In view of the state of the art of methods for preparing nanocrystalline powders, it would be desirable to develop uses of the nanocrystalline intermetallic powders in various fields of technology.

The present invention provides a variety of new uses for nanosized powders, the new uses utilizing advantageous and/or unique properties of such nanosized powders.

In one respect, the present invention provides intermetallic nanosized powders having a variety of applications. The powders can be made by techniques which provide control over the size, shape, and surface morphology of the nanoparticles that are produced.

Precise control of shape, size and surface morphology of materials at the nano scale level should serve as the underlying basis for building new high performance innovative materials that possess novel electronic, magnetic, and catalytic properties. Such materials are essential for technological advances in various fields of applications.

DETAILED DESCRIPTION OF THE INVENTION

The present invention relates to development of new applications of nanosized intermetallic powders, such powders being made by any suitable technique such as atomizing, laser evaporation, chemical or other techniques, e.g., the laser evaporation technique includes subjecting a starting material to laser energy so as to form a vapor and condensing the vapor so as to form intermetallic nanoparticles.

The nanosized intermetallic powders can be made of binary intermetallic alloy compositions or complex intermetallic alloy compositions of alloy systems such as aluminides (e.g., iron aluminide, nickel aluminide or titanium aluminide) or intermetallic magnetic alloy compositions such as iron-cobalt alloys. In general, the iron aluminide compositions can include $Fe_3Al$ and FeAl type compositions, e.g., various $Fe_3Al$ and FeAl compositions including 4–32 wt. % Al and various alloying elements including Mo, Zr, B, C, etc. are disclosed in commonly owned U.S. Pat. No. 5,620,651 and other iron aluminide compositions are disclosed in the patents and publications cited therein. The titanium aluminide compositions can include TiAl type compositions, e.g., various TiAl compositions including 25–35 wt. % Al and various alloying elements such as Nb, Ta, W and B are disclosed in commonly owned U.S. Ser. No. 09/660,961 filed on Sep. 13, 2000 and other titanium aluminide compositions are disclosed in the patents and publications cited therein. The nickel aluminide compositions can include $Ni_3Al$ and NiAl type compositions, e.g., various nickel aluminide compositions are disclosed in U.S. Pat. No. 5,006,308. Various soft magnetic Fe—Co alloys including additions such as Ta, Nb, V, Mo and Cr are disclosed in U.S. Pat. Nos. 4,933,026; 5,252,940; and 5,817,191.

Nanosized powder materials according to the invention can be prepared by any suitable technique such as chemical synthesis, gas-phase synthesis, condensed phase synthesis, high speed deposition by ionized cluster beams, consolidation, high speed milling, deposition and sol-gel methods. Such powders can enhance the ductility of FeAl and TiAl by using nanosized intermetallic powders as opposed to atomized powders. The same results can be accomplished with $Ni_3Al$ and NiAl powders.

One object of the invention is to obtain intermetallics such as $Fe_3Al$ and FeAl with unique magnetic properties so that they can be used for magnetic applications such as bar coding and for magnetic ink applications. Iron aluminides may also be printed on electronic circuits for magnetic applications. In addition, the oxidation resistance of iron aluminides may allow such magnets to be used at high temperatures. Nanosized powders of $Fe_3Al$ and FeAl may be used to manufacture resistive inks for thick film electronic circuits to print resistors that are stable to high temperatures. Powders produced in the presence of oxygen may have a film around the particle and such powders may be used to obtain resistive inks with higher resistivities. Today this is accomplished with the addition of oxides. Further, brilliance of the inks can be improved by small additions of the intermetallic particles of Cu—Al to existing inks.

According to the invention it is possible to synthesize nanosized intermetallic powders such as $Fe_3Al$, FeAl, TiAl, NiAl, and $Ni_3Al$ with very unique properties as compared to the bulk materials obtained by melting and atomization techniques. Nanosized intermetallic powders also exhibit unique magnetic properties. They can be processed at low temperatures to fully dense intermetallics. In contrast, water and gas atomized powders require temperatures in the range 1200 to 1300° C. In addition, fully dense intermetallics based on nanosized powders (as compared to the atomized powders) can exhibit high ductility due to the small grain size nature of the product. They can be processed by laser evaporation and/or chemical decomposition techniques. The powders can be produced in inert atmospheres such as argon or helium, or by bleeding a certain amount of oxygen, nitrogen, or ammonia to alter the surface property of the powders. Modification of the surface property will allow dispersion of the powder for tape casting, and for preparation of the inks for digital printing technology. The sizes of the particles may be altered by the residence time of the laser pulse, cooling time, temperature, etc.

The invention can provide savings on processing time, temperature, cost, ease of processing, much better engineering materials, ability to make specialty inks, resistive pastes, etc.

Nanoparticles often exhibit novel properties, which are different from the bulk materials' properties. Many of these properties show strong dependence on size, shape and surface preparation. The characterization of these properties can ultimately lead to identifying many potential uses, particularly in the field of catalysis.

One process to synthesize nanoparticles of controlled size and composition is called LVCC. LVCC denotes the pulsed laser vaporization with controlled condensation technique carried out in a diffusion cloud chamber under well-defined conditions of temperature and pressure. It allows the synthesis of a wide body of nanoparticles of metal oxides, carbides and nitrides. Furthermore, the same method can be coupled to plasma and ionic polymerization techniques, thus allowing the incorporation of the metallic nanoparticles within polymer films.

The LVCC method can be used for the synthesis of nanoparticles of intermetallic alloys. Intermetallic alloys such as FeAl, $Fe_3Al$, NiAl, TiAl, $CuAl_2$ and FeCoV exhibit a wide variety of interesting mechanical, electronic, photochemical and catalytic properties. In contrast to bulk materials, the FeAl nanoparticles exhibit magnetic properties at room temperature.

The nanosized intermetallic powders according to the invention can be used in structural applications. For instance, the nanosized intermetallic powders can be processed into articles such as sheets, rods, bars and thin foils. Because intermetallic alloys are brittle and therefore difficult to process, powder metallurgical processing techniques have been developed to form articles using powders of the intermetallic alloys. Use of nanosized powders can provide processing advantages in that the small size of the powders can provide better ductility of the articles formed from the powder. That is, according to the Hall-Petch relationship, as the grain size becomes smaller the strength and elongation increase. Thus, nanosized powders offer the possibility to obtain improvements in processing by powder metallurgical techniques compared to the use of gas atomized or water atomized powders. According to the invention, the nanosized powders can be processed according to the techniques disclosed in commonly owned U.S. Pat. No. 6,030,472, the disclosure of which is hereby incorporated by reference. For instance, the powders can be processed by roll compaction wherein the nanosized intermetallic powder is mixed with a binder and roll compacted into a strip, the binder is burned out, the strip is sintered, cold rolled and annealed until the desired size is achieved. In order to maintain the benefits that the nanosized particles provide, it is desirable that the sintering be carried out at temperatures which prevent grain growth. Further, grain growth inhibitors such as nanosized or larger oxide particles for restricting grain growth can be incorporated in the powder mixture to minimize grain growth during sintering. The nanosized powder could be also processed by tape casting a mixture of the nanosized powder and organic binder followed by sintering, cold rolling and annealing as in the case of roll compaction. The small size of the powders will allow the sintering to be carried out at lower temperatures and/or for shorter times since the small powder size provides a higher surface area which is favorable for sintering of the particles together. Also, due to the small powder size it is possible to achieve higher density upon compaction of the powder which allows higher densities to be achieved during sintering. For example, a 6–9 nm FeAl powder can be uniaxially compressed to close to 95% density and because of the reduced porosity, during sintering it is possible to achieve nearly 100% theoretical density.

Structural applications for the nanosized intermetallic powders according to the invention can include heating elements, furnace fixtures, heat-exchanger piping, sintered porous gas-metal filters, automobile and other industrial valve components, catalytic converter substrates and components for molten salt applications. Additional applications include parts exposed to high-temperature oxidation and/or corrosive environments. Other applications include parts requiring resistance to carburization, sulfidation and/or molten salt. The nanosized powder can be used to form bulk parts or it can be used as a coating on or filler in parts. Examples of specific parts include trays, baskets, retorts, muffles, roller conveyors, dies, heat exchangers, burners, heating elements, waste incinerators, forged components such as valves or valve inserts for automotive applications, nozzles, axles, spindles, shafts, turbine engine mounts, housings, turbine blades, vanes, tail pipes, seals and shafts, filters, desalination units, hot gas filters for coal gasification systems, medical instruments, medical implants, honeycomb structures for automobile, diesel and aircraft exhaust systems, etc.

Magnetic applications of the magnetic nanosized intermetallic powder according to the invention include transformers, choke coils, etc. Nanosized magnetic intermetallic alloy compositions include $Fe_3Al$, FeAl or FeCoV type alloy systems. The nanosized magnetic powder can be processed into suitable forms such as bulk parts or thin ribbons, wires, etc. During processing of the powders, it is desirable to minimize grain growth so that the sintered powders provide a part with nanocrystalline grain size and high magnetic permeability. The nanosized powder can also be used as a coating, filler or magnetic ink. Due to the small size of the magnetic powder, parts can be formed with high mechanical properties and high saturization magnetization.

The invention also provides intermetallic nanosized powders useful as catalyst materials. For instance, the powders can be used to support noble metal catalysts such as platinum, palladium, rhodium or the like on the surface of the nanosized powders. As an example, the nanosized powders with the noble metal catalyst thereon can be formed into a paste and printed or sprayed onto a substrate. Alternatively, the catalyst containing nanosized powders can be embedded in a support material. In use, the high surface area of the nanosized powder provides enhanced chemical activity, i.e., the catalyst material can achieve a greater degree of catalyst activity. Thus, the nanosized intermetallic powder according to the invention can be used as a catalyst in various applications including catalytic converters, hydrocracking catalysts used for hydrodenitrogenation, hydrodesulfurization and hydrodemetallation, hydrogen sulfide conversion, and the like.

The nanosized intermetallic powders according to the invention are also useful for resistive heating applications. Such powders can be applied as a thin film paste to a substrate and used as heating elements. A preferred composition for such heating elements is a Ni-free and Cr-free FeAl type composition, examples of which can be found in commonly owned U.S. Pat. No. 5,620,651, the disclosure of which is hereby incorporated by reference. For example, the FeAl type composition can include, in weight percent, 14–32% Al, $\leq$1% Cr, 0.05–1% Zr, Mo in an amount effective to promote solid solution hardening of the alloy and provide resistance to creep of the alloy when exposed to high temperatures, balance including Fe. The alloy can include $\leq$30% electrically insulating and/or electrically conductive covalent ceramic particles or fibers or the alloy can be free of such particles or fibers. The alloy can include additions such as $\leq$2% Mo, $\leq$2% Ti, $\leq$2% Si, $\leq$0.5% Y, $\leq$0.1% B, $\leq$1% Nb, $\leq$1% Ta, $\leq$3% Cu and $\leq$1% C. The alloy composition can be selected to exhibit a room temperature resistivity of 80–400 micro ohms.cm. A preferred alloy includes 21–30% Al, $\leq$1% Cr, 0.0025–0.01% B, 0.3–0.5% Mo, 0.05–0.15% Zr, 0.01–0.1% C, balance Fe.

The nanosized intermetallic powder according to the invention offers advantages in screen printing applications. For instance, the nanosized powder provides high resolution and small feature size useful in screen printing applications and avoids the need for grinding the powder to achieve a small size for the paste used in the screen printing operation. Thus, the nanosized powder according to the invention can be used for superfine circuit patterns on various substrates such as sintered ceramic substrates (e.g., alumina or aluminum nitride), or directly on green ceramic tapes. For instance, the nanosized powder can be screen printed on a green ceramic tape and the screen printed tape can be processed by steps including drying, debinding and sintering to produce the desired article. In order to change the resistive property of the screen printed film, ceramic powder can be incorporated in the screen printed film whereby the resistance of a printed resistor or other circuit element can be changed by, for example, 2–4 orders of magnitude. In this case, it is possible to provide thin film conductors, resistors and capacitors. Details of thick film circuit formation are described in the chapter entitled "Thick Film Circuits" in Volume 4 of the Engineered Materials Handbook entitled "Ceramics and Glasses", pages 1140–1144, 1991, the disclosure of which is hereby incorporated by reference. In general, thick film compositions include a vehicle or screening agent, a glass frit and functional materials, the vehicle allowing the formation of an ink with the required rheology for easy application to the substrate. By using nanosized intermetallic powders as a functional material/additive, it is possible to obtain a uniform distribution of the nanosized powder in the thick film composition and avoid agglomeration or settling of such powder during the screen printing process. The electrical properties of the screen printed circuit can be varied by incorporating nanosized or larger oxide powder with the intermetallic alloy powder. Thus, the functional screen printed composition can include conductors, resistors and dielectrics such as capacitors.

Another use of the intermetallic nanosized powders according to the invention is for magnetic ink useful for printing applications such as bar codes or magnetic images on documents or packaging. Printed bar codes are typically optically scanned to derive data which is digitized, stored in memory and subsequently decoded to recover the data encoded in the bar code. Such bar codes may comprise black or dark colored bar type elements printed on a white or light colored background area with white or light colored spaces between the elements of the bar code. The bar code can be printed with a magnetic substance such as magnetic ink so as to be readable both by an optical reader and a magnetic reader. See, for instance, U.S. Pat. No. 5,938,726, the disclosure of which is hereby incorporated by reference. The nanosized intermetallic magnetic powder according to the invention offers the potential for forming such bar codes with smaller lines due to the small size of the metal powders and because of the fineness of the powder, the powders exhibit increased zeta potential, that is, as the size of the powder decreases, the surface charge increases. The nanosized intermetallic magnetic powders can comprise $Fe_3Al$, FeAl or FeCoV alloy compositions. The nanosized magnetic powder offers increased sensitivity allowing the bar code to be read with readers set at lower power levels thus enabling magnetic bar codes in accordance with the invention to distinguish authentic goods or documents from counterfeit goods or documents. That is, counterfeit goods including counterfeit bar codes could be readily distinguished since they would not include the highly magnetized intermetallic powder according to the invention. As such, images containing the magnetic powder according to the invention would have increased magnetic properties allowing the images (e.g., bar codes) to be read with more sensitive scanners whereas such sensitive scanners would not be able to read the counterfeit images.

While the invention has been described with reference to preferred embodiments, it is to be understood that variations and modifications may be resorted to as will be apparent to those skilled in the art. Such variations and modifications are to be considered within the purview and scope of the invention as defined by the claims appended hereto.

What is claimed is:

1. A magnetic bar code comprising nanosized intermetallic powder wherein the intermetallic powder comprises FeAl powder having magnetic properties.

2. An ingredient of magnetic ink comprising nanosized intermetallic powder wherein the intermetallic powder comprises FeAl powder having magnetic properties.

3. Nanosized intermetallic powder wherein the intermetallic powder comprises an iron aluminide alloy powder having, in weight %, 4.0 to 32.0% Al and $\leq 1\%$ Cr.

4. A catalyst material comprising the nanosized intermetallic powder of claim 3.

5. Nanosized intermetallic powder wherein the intermetallic powder comprises an iron aluminide alloy powder having, in weight %, at least 0.2% oxygen.

6. Nanosized intermetallic powder wherein the intermetallic powder comprises an iron aluminide alloy powder having, in weight %, at least 0.1% C.

7. Nanosized intermetallic powder wherein the intermetallic powder comprises an iron aluminide alloy powder produced by laser evaporation or chemical decomposition in an inert atmosphere such as argon or helium.

8. The nanosized intermetallic powder of claim 7, wherein the atmosphere contains an amount of a surface modifying gas such as oxygen, nitrogen, carbon monoxide or ammonia to change a surface property of the powder.

9. Nanosized intermetallic powder wherein the intermetallic powder comprises an iron aluminide alloy powder having, in weight %, $\leq 32\%$ Al, $\leq 2\%$ Mo, $\leq 1\%$ Zr, $\leq 2\%$ Si, $\leq 30\%$ Ni, $\leq 10\%$ Cr, $\leq 0.3\%$ C, $\leq 0.5\%$ Y, $\leq 0.1\%$ B, $\leq 1\%$ Nb, $\leq 3\%$ W, and $\leq 1\%$ Ta.

10. Nanosized intermetallic powder wherein the intermetallic powder comprises an iron aluminide alloy powder having, in weight %, 20 to 32.0% Al, 0.3 to 0.5% Mo, 0.05 to 0.3% Zr, 0.01 to 0.5% C, $\leq 0.1\%$ B, $\leq 1\%$ oxide particles, balance including Fe.

11. A shaped body comprising the nanosized intermetallic powder of claim 3, wherein the shaped body has high ductility and/or small grain size.

12. The shaped body of claim 11, wherein the shaped body is formed by tape casting or roll compaction or injection molding or pressing.

13. A screen printed resistance heater comprising the nanosized intermetallic powder of claim 9.

14. A printed image comprising the nanosized intermetallic powder of claim 9.

15. A circuit element of a thick film circuit comprising the nanosized intermetallic powder of claim 9.

* * * * *

UNITED STATES PATENT AND TRADEMARK OFFICE
CERTIFICATE OF CORRECTION

PATENT NO. : 6,746,508 B1
DATED : June 8, 2004
INVENTOR(S) : Seetharama C. Deevi et al.

It is certified that error appears in the above-identified patent and that said Letters Patent is hereby corrected as shown below:

Column 1,
Line 4, "which Corres. to" should read -- which claims benefit of --;
Line 5, "60/160,184" should read -- 60/160,864 --;
Line 58, "at%" should read -- at. % --; and Column 2,
Between lines 31 and 32, -- SUMMARY OF THE INVENTION -- should be inserted.

Signed and Sealed this

Thirtieth Day of November, 2004

JON W. DUDAS
*Director of the United States Patent and Trademark Office*